United States Patent [19]

Kuster et al.

[11] Patent Number: 5,290,999
[45] Date of Patent: Mar. 1, 1994

[54] CONTINUOUS FURNACE FOR HEATING GLASS PANES TO BENDING AND/OR TOUGHENING TEMPERATURE

[75] Inventors: Hans-Werner Kuster; Jean-Pierre Lacoste, both of Aachen, Fed. Rep. of Germany; Luc Vanaschen, Eupen, Belgium

[73] Assignee: Saint-Gobain Vitrage International, Courbevoie, France

[21] Appl. No.: 879,987

[22] Filed: May 8, 1992

[30] Foreign Application Priority Data

May 10, 1991 [DE] Fed. Rep. of Germany ....... 4115235

[51] Int. Cl.$^5$ .................... C03B 35/24; C03B 23/035; C03B 25/093
[52] U.S. Cl. ...................... 219/388; 65/118; 65/182.2; 65/268; 432/124; 414/223
[58] Field of Search .................... 219/388; 65/118, 119, 65/104, 268, 182.2; 432/124, 138, 142; 34/216, 184, 187; 414/149, 223, 586

[56] References Cited

U.S. PATENT DOCUMENTS

| | | | |
|---|---|---|---|
| 505,418 | 9/1893 | Clabby | 65/268 |
| 508,934 | 11/1893 | George et al. | 65/268 |
| 543,207 | 7/1895 | George et al. | 65/268 |
| 694,711 | 3/1902 | Anderson et al. | 65/268 |
| 2,682,730 | 7/1954 | Rossen | 65/104 |
| 3,087,316 | 4/1963 | Nitschke et al. | 65/268 |
| 3,223,501 | 12/1965 | Fredley et al. | 65/119 |
| 3,510,284 | 5/1970 | McMaster et al. | 65/182.2 |
| 3,551,130 | 12/1970 | McMaster | 65/119 |
| 3,607,198 | 9/1971 | Meunier et al. | 65/119 |
| 3,854,398 | 12/1974 | Martin | 101/115 |
| 4,432,782 | 2/1984 | Seymour | 65/182.2 |
| 4,474,109 | 10/1984 | Yara | 101/115 |
| 5,019,689 | 5/1991 | Bollier et al. | 219/388 |
| 5,021,075 | 6/1991 | Vanaschen et al. | 65/287 |
| 5,053,069 | 10/1991 | Vanaschen et al. | 65/115 |
| 5,066,321 | 11/1991 | Kramer et al. | 65/182.2 |
| 5,136,938 | 8/1992 | Pellegrina | 101/115 |
| 5,194,082 | 3/1993 | Hirota | 65/102 |

FOREIGN PATENT DOCUMENTS 61-127627 6/1986 Japan .
1429343 3/1976 United Kingdom ............... 65/182.2

Primary Examiner—Bruce A. Reynolds
Assistant Examiner—John A. Jeffery
Attorney, Agent, or Firm—Oblon, Spivak, McClelland, Maier & Neustadt

[57] ABSTRACT

A continuous furnace (straight-through furnace) for heating glass panes to their curving and/or toughening temperature is constructed as a circular furnace and comprises an annular, horizontal hot gas support bed (3). On this annular hot gas support bed (3) the glass panes are carried, each by means of a template (56) of heat-resistant metal plate, also floating on the hot gas support bed (3), in a circuit from the feed station (6) to the discharge station (7). The templates (56) are each mounted on the arms (17) of a star-type turntable (16) concentrically to the support bed (3). At the discharge station (7) the glass panes, heated to bending and/or toughening temperature, are removed from the furnace by means of a radially traversable suction plate (42) and transferred into a bending and/or toughening device disposed laterally alongside the furnace.

9 Claims, 5 Drawing Sheets

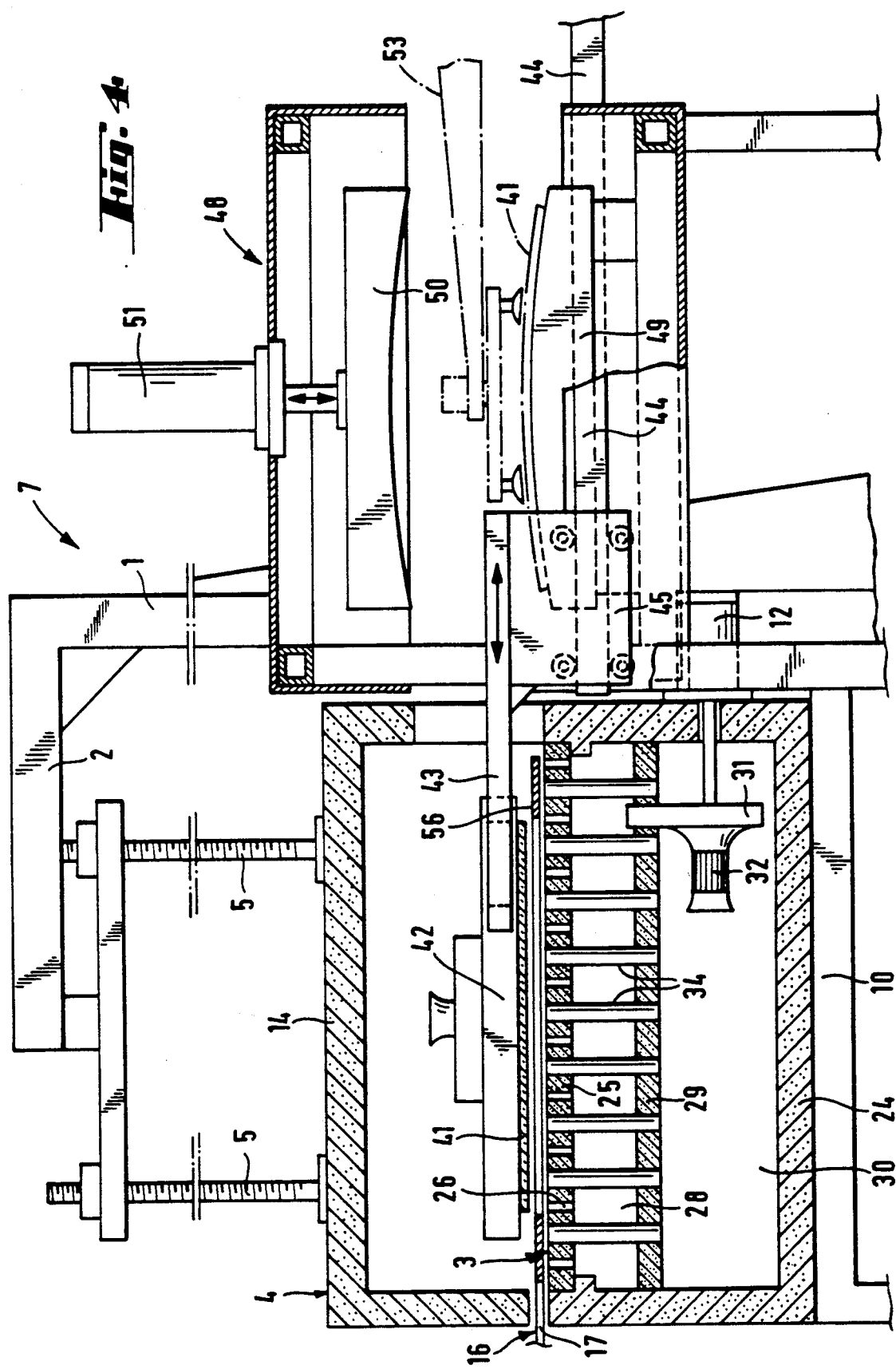

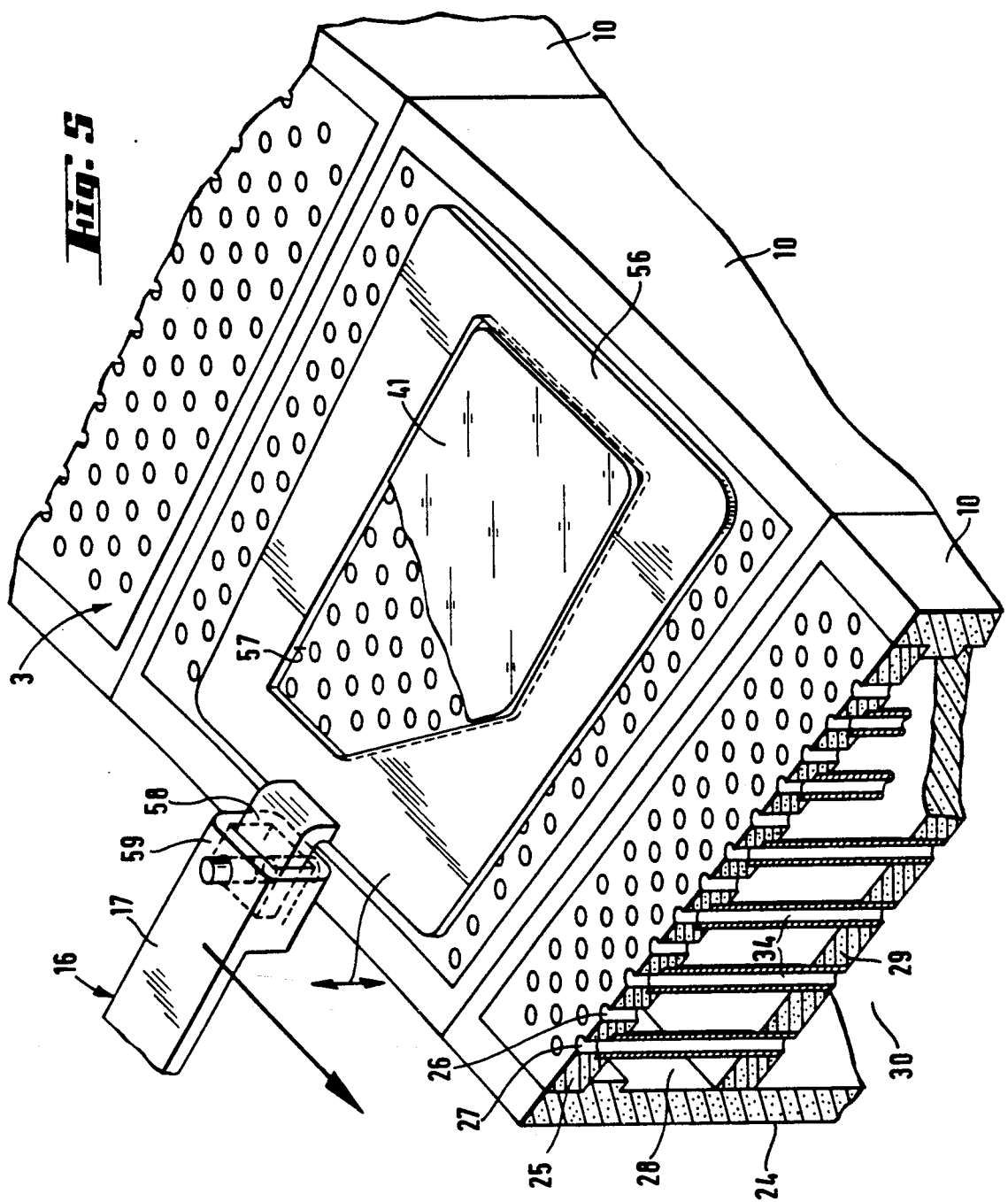

CONTINUOUS FURNACE FOR HEATING GLASS PANES TO BENDING AND/OR TOUGHENING TEMPERATURE

BACKGROUND OF THE INVENTION

1. Field of the Invention

This invention relates to a continuous furnace (once-through furnace) for heating glass panes to their bending and/or toughening temperature, comprising a hot gas support bed and comprising an entraining apparatus, acting upon the edges of the panes, for conveying the glass panes over the hot gas support bed from a feed station to a discharge or transfer station. The invention furthermore relates to a bending and toughening installation for glass panes comprising a furnace of this type.

2. Description of the Related Art

In the known continuous furnaces comprising a hot gas support bed (e.g. U.S. Pat. No. 3,223,501), the plane hot gas support bed is of linear form and is slightly inclined to the horizontal, transversely to the conveying direction of the glass panes. As entraining devices for the glass panes, driven entraining rollers having their axes of rotation perpendicular to the plane of the support bed are disposed along the lower longitudinal edge of this bed. The glass panes bear with one longitudinal edge, as a result of the force components acting in the direction of slope of the conveying plane due to their weight and the floating arrangement on the support bed, against the entraining rollers and are conveyed onwards by frictional engagement with these rollers. The glass panes are laid on the hot gas support bed or transferred from conveying rollers onto the hot gas support bed at one end of the furnace. The discharge or transfer of the heated glass panes from the hot gas support bed takes place at the other end of the rectilinear furnace, that is to say at a more or less large distance from the charging point of the furnace.

For a continuous furnace for glass panes, even if the furnace is fully automated, the feed station and discharge station of the furnace must be continually monitored. A linear continuous furnace has, however, a comparatively large length, and the feed and discharge stations are consequently so far apart that a separate monitoring person or operator is necessary for monitoring each of these two stations.

SUMMARY OF THE INVENTION

The objective of the present invention is to create a continuous furnace for heating glass panes with continuous or step-by-step throughput, which for equivalent capacity to a corresponding linear continuous furnace, can be operated with fewer operating personnel than the known continuous furnaces, on account of its constructional design.

The continuous furnace according to this invention is characterized in that it possesses an annular, horizontal hot gas support bed and an entraining apparatus disposed concentrically to the annular hot gas support bed and comprising entraining devices or dogs guided on a circular path, which each engage a glass pane at at least three points and guide it on a circular path from the feed station to the discharge station.

In a circular furnace of this type, the feed and discharge stations lie close together and can be operated and/or monitored by one and the same operator. Thus a furnace of this type or a bending and/or toughening plant comprising such a furnace can be operated in a comparatively small space and with a minimum of operating personnel, and is therefore extremely economical to run.

BRIEF DESCRIPTION OF THE DRAWINGS

FIG. 4 is a section in the vertical plane IV—IV in FIG. 2, and

FIG. 5 is an entraining apparatus constructed as a template.

DETAILED DESCRIPTION OF THE PREFERRED EMBODIMENTS

Figure 1:
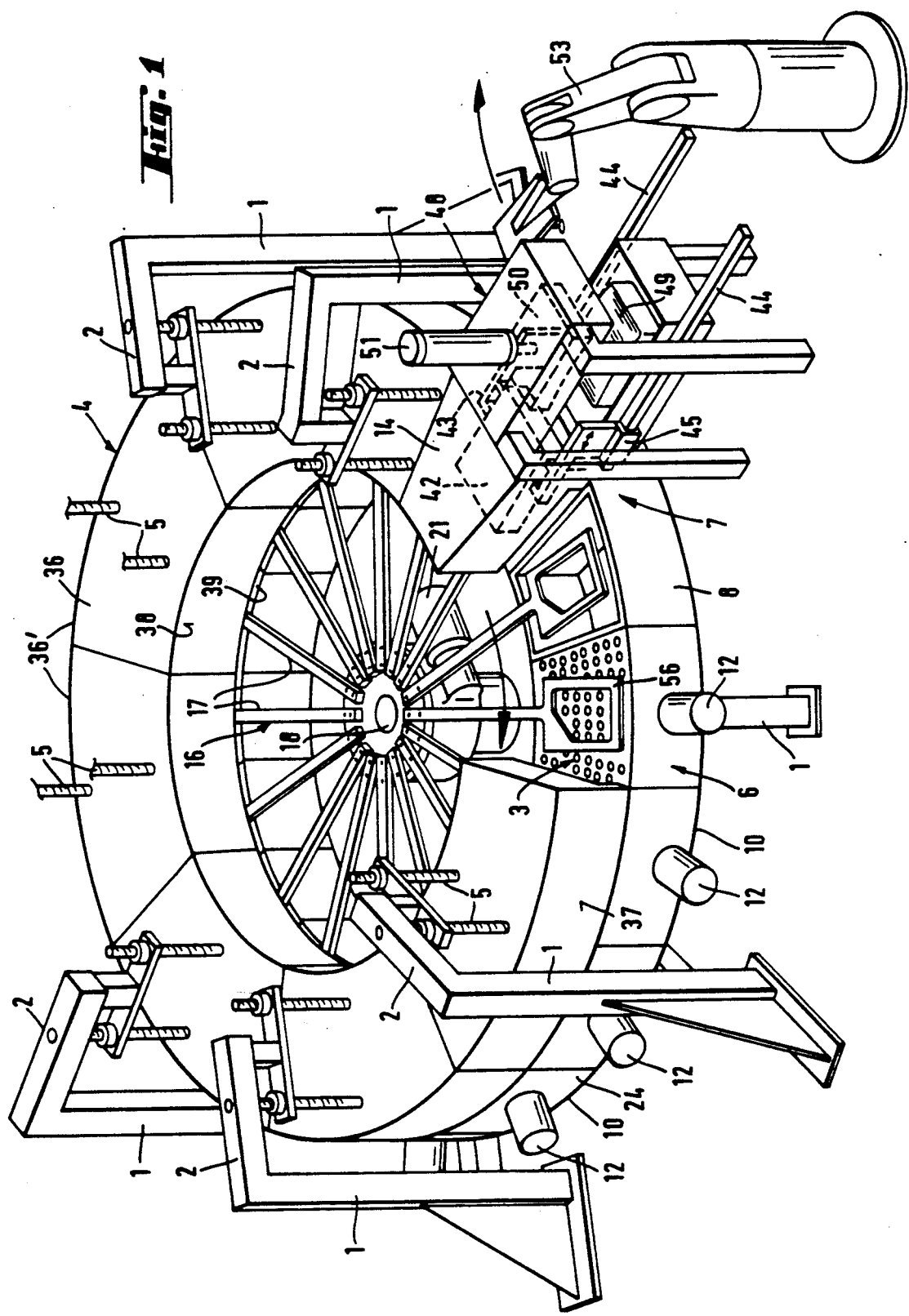
FIG. 1 shows an installation according to this invention for producing curved and toughened glass panes, seen in perspective general view.
Figure 2:
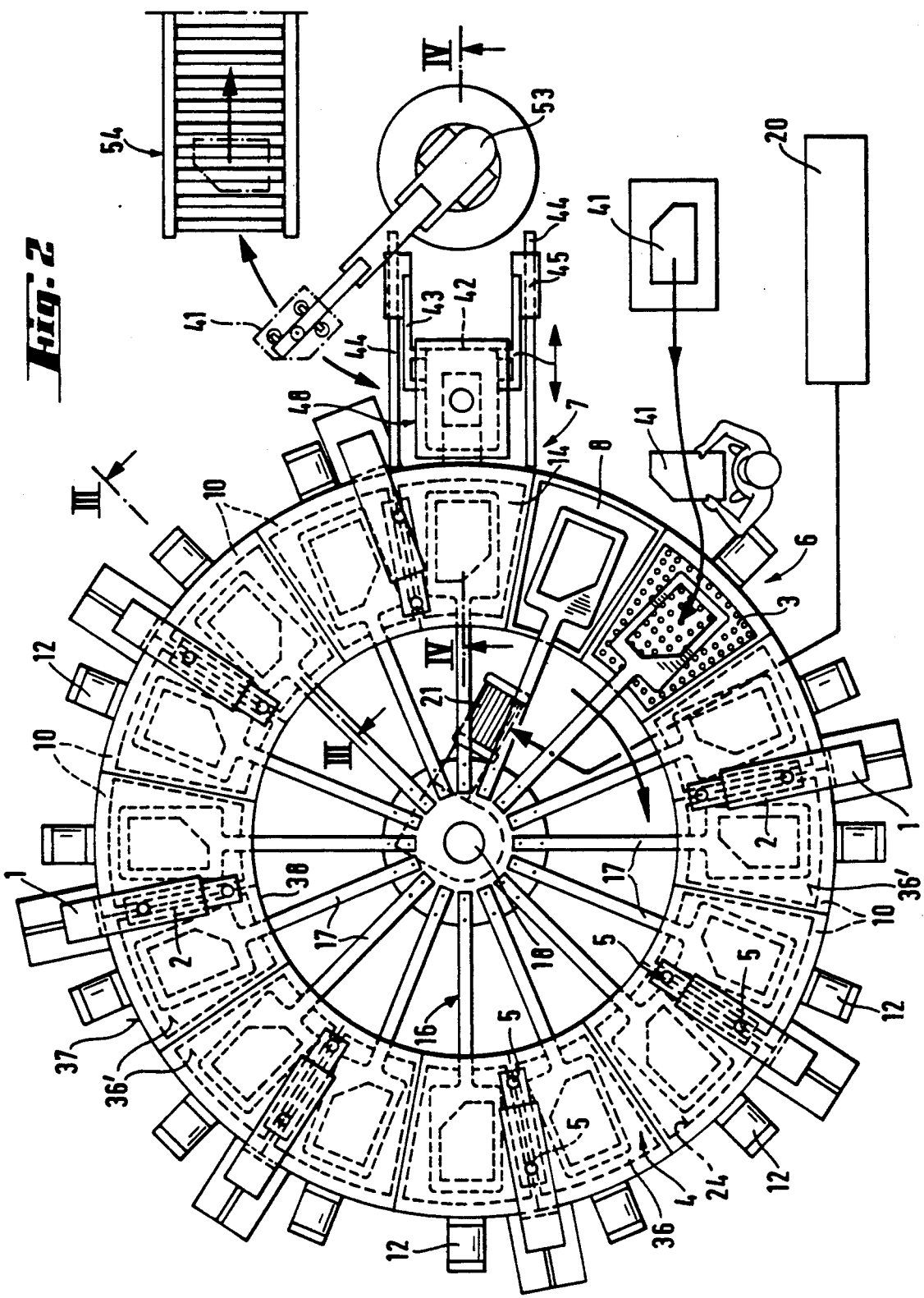
FIG. 2 is a plan view of the installation shown in FIG. 1.

As can be seen from FIGS. 1 and 2, the furnace comprises a support structure consisting of columns 1 and transverse beams 2, which carry, on the one hand, the hot gas support bed 3 and, on the other hand, the upper part 4 of the furnace. The upper part 4 of the furnace is divided into individual segments, which are each fixed to spindles 5 and can be raised as separate segments. The hot gas support bed 3 is of annular shape and the annular surface, which is provided with gas outlet openings and gas discharge openings, is horizontally orientated and forms a plane surface. The annular support bed 3 does not constitute a closed ring, but is interrupted between the feed station 6 and the discharge station 7. At this position, between the feed station 6 and the discharge station 7, a fragment collecting vessel 8, for instance, may be disposed, in which cullet produced in the case of a glass breakage can be collected.

The space underneath the actual hot gas support bed 3 is divided into a series of segments, in the case illustrated into a total of 15 annular segments 10, all of the same size. At the position of the sixteenth annular segment, the cullet collecting vessel 8 is disposed. Each of the fifteen annular segments 10 constitutes, underneath the hot gas support bed 3, a closed chamber, in each of which the hot gas stream is created by means of a fan driven by a motor 12. The temperature of the hot gas stream can be separately regulated in each annular segment, if necessary also the gas pressure. The construction of the furnace segments will be described later in more detail.

At the feed station 6, in which the hot gas support bed 3 is at ambient temperature or a temperature only comparatively little above ambient, there is no roof construction, so that the glass panes can be laid freely and unimpeded onto the gas support bed. The laying of the glass panes can be performed by hand or by means of an automatic laying apparatus. In the discharge station 7, in contrast, the roof construction has a thermally insulating jacket 14, which prevents the glass panes in the discharge station 7 from cooling down.

In the furnace illustrated, transporting of the glass panes through the furnace favourably takes place by steps, each step corresponding to the angular dimension of one annular segment. The conveying may also, however, be performed continuously at constant velocity, in which case the laying operation and discharge operation must be carefully tuned to the movement of the glass panes. Likewise, the conveying of the glass panes over the hot gas support bed may also be carried out with periodically varying speed, for example a high angular velocity from one annular segment to the next and a greatly reduced angular velocity in the last portion of the path, in order to facilitate the discharge operation and feed operation.

For conveying the glass panes over the hot gas support bed 3, a star-type turntable 16 having a total of sixteen radially extending arms 17 at uniform angular spacings is used. The star turntable 16 is rotatably journalled on a vertical axis of rotation 18. The axis of rotation 18 is disposed at the centre-point of the annular surface of the hot gas support bed 3. For the continuous or step-by-step rotational drive of the star turntable 16, an electric motor 21, controlled by a process controller 20, is used. Each arm 17 of the star-type turntable 16 carries, at its free end, a suitable entraining device, which each touches a glass pane at at least three points and guides it in a circular path over the hot gas bed. An especially favourable form of construction of an entraining device is described later with reference to FIG. 5.

Instead of a centrally driven star-type turntable, the entraining apparatus may also be constructed by an endless chain being guided along the inner wall of the furnace but outside the furnace, along a circular track concentric with the furnace, the entraining devices penetrating into the furnace being mounted on this chain. The endless chain may be driven at the desired speed or desired rhythm, for example by means of a driven pinion engaging into the chain.

Figure 3:
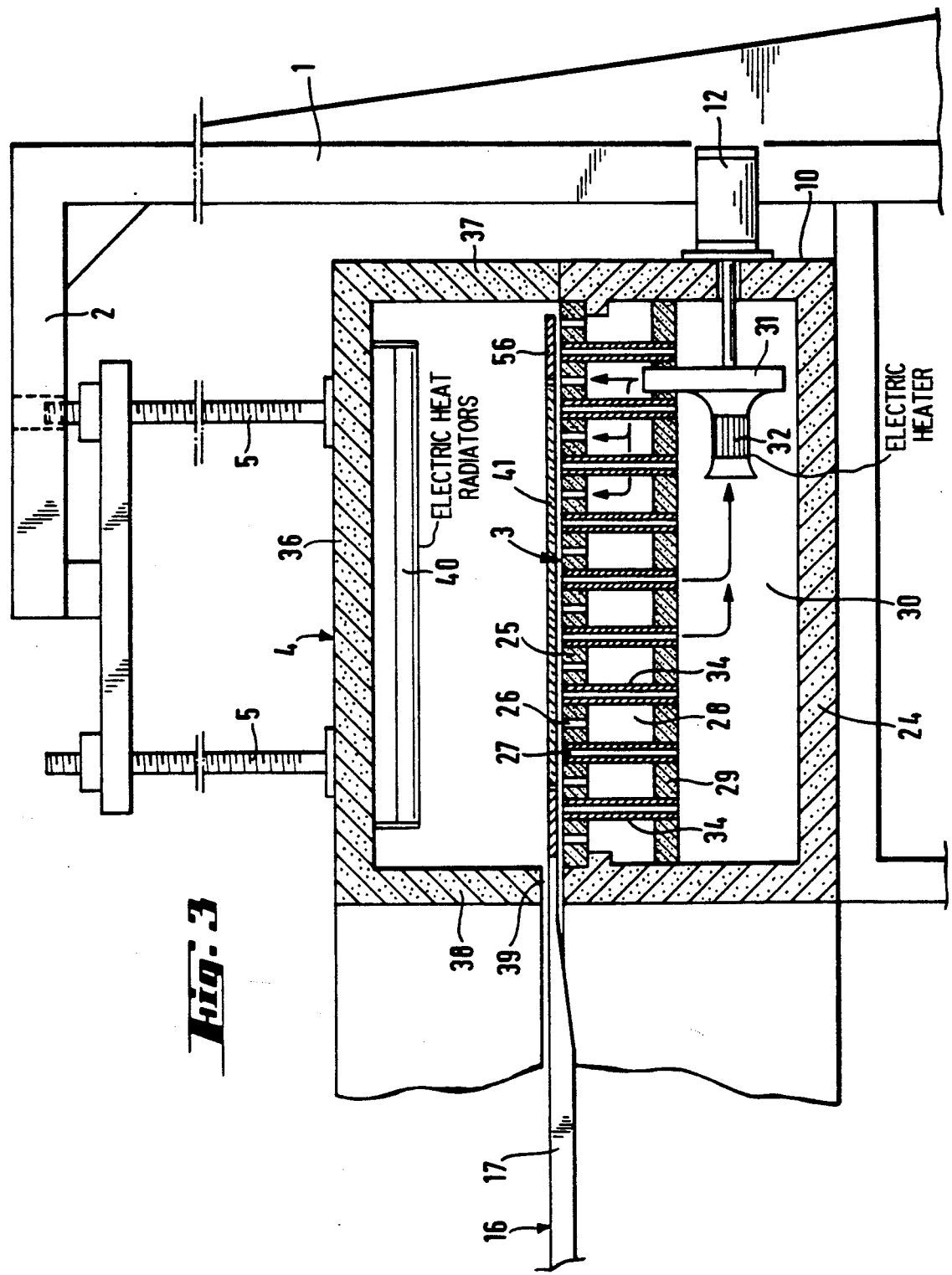
FIG. 3 is a section in the vertical plane III—III in FIG. 2.

The construction of the furnace and that of the hot gas support bed are illustrated in their important components in FIG. 3. The lower part of the furnace, forming the hot gas support bed 3, comprises a suitably thermally insulated housing 24 having a closed base and closed side walls. At the top, the housing 24 is closed off by a plane plate 25 of heat-resistant material, which possesses gas outlet openings 26 and gas suction openings 27 alternating at regular intervals. The gas outlet openings 26 connect the upper face of the plate 25 to the intermediate space 28 underneath the plate 25. This intermediate space 28 is closed at the bottom by a partition wall 29, parallel to the plate 25. Beneath this partition 29 is a space 30, in which a blower 31 is mounted. The blower 31 is driven by the electric motor 12, disposed on the outer wall of the housing 24. In front of the intake to the blower 31, an electrical heater 32 is disposed, which serves for heating the sucked-in air to the desired temperature.

The hot air stream created by the blower 31 is guided into the space 28 and produces, in this space 28, an overpressure of suitable magnitude for the hot air to flow out of the openings 26 in the plate 25 and form the desired hot air cushion for the frictionless conveying of the glass panes. The hot gas flows underneath the glass panes through the discharge openings 27 situated between the outlet openings 26 and through the pipes 34, connected to the discharge openings 27 and passing through the partition 29, into the space 30 underneath the partition 29. In this way the hot air is conducted in a closed circuit, so that only a small heating of the air by the heater 32 is necessary when the operating temperature of the furnace has been reached.

The roof construction 4 of the furnace also comprises a suitably thermally insulated housing 36, which is favourably divided into individual segments 36', which can be individually raised when access to the hot gas support bed is necessary. Whereas the outer lateral wall 37 of the housing 36 rests upon the lower part of the furnace and thus ensures a tight closure of the outer lateral wall of the furnace, the inner lateral wall 38 of the housing 36 terminates above the lower part of the furnace, thus forming a continuous gap 39, through which the arms 17 of the star-type turntable penetrate into the furnace. Inside the housing 36, electrical heating radiators 40 are mounted, which serve for heating the glass panes to the desired temperature in each of the individual zones.

The glass panes, when they have passed through the furnace, have reached the desired temperature of, for instance, 650° C. and are removed from the furnace at the discharge station 7. The removal of the heated glass panes 41 is performed, in the case illustrated, by means of a traversable suction plate 42. The suction plate 42 can be traversed, by a suitable mounting 43 and a trolley 45 travelling on rails 44, in such a way that the glass panes 41 are held by suction force against the suction plate 42 and are brought into a processing station disposed adjacent to the furnace.

In the case of the processing station 48 illustrated schematically in FIGS. 1 and 2, this is a combined bending and toughening station, in which the heated glass panes are curved and thermally toughened by abrupt cooling in one operation between two water-cooled curving moulds 49, 50. Whereas the lower cooled curving mould 49 is stationarily mounted, the upper curving mould 50 is mounted movable in a vertical direction and can be raised and lowered by a power cylinder 51. While the upper curving mould 50 is in a raised position, the heated glass pane is laid by means of the suction plate 42 on the lower curving mould. The suction plate 42 then travels back into its starting position, and the upper curving mould 50 is pressed by means of the power cylinder 51 against the lower curving mould 49, causing the glass pane to be curved and toughened.

Suitable apparatuses for the simultaneous curving and contact toughening are themselves known and have been described, for example, in U.S. Pat. No. 5,053,069 and U.S. Pat. No. 5,021,075. Instead of the curving and contact toughening apparatus illustrated, however, any desired other type of curving or bending and/or toughening device may, of course, laterally adjoin the discharge station 7.

The curved and toughened glass panes, after the upper curving mould 50 has been brought into its upper limiting position, are taken from the lower curving mould 49 by means of a robot 53 and transferred onto a conveyor 54.

An especially advantageous design of entraining apparatus for the glass panes is illustrated in FIG. 5. The entraining device, mounted on one arm 17 of the star-type turntable, consists of a template 56 of heat-resistant steel sheet, the inner contour 57 of which corresponds to the outer contour of the glass panes. Since the inner contour 57 surrounds the glass sheet, it comprises means for engaging at least two non-parallel sides of the glass sheet. The template 56, like the glass pane, floats on the hot gas support bed, so that an automatic guidance in height of the template in each case in the most favourable position above the surface constituting the support bed is thereby obtained. The template 56 is provided with a lug 58, by which the connection of the template 56 to a suitable coupling piece 59 at the end of the arm 17 of the star turntable is effected. The connection at the coupling piece 59 should be so constructed that the position of the template 56 in the radial direction, that is to say in the direction of the arm 17, and in the tangential direction, that is perpendicularly to the arm 17, is determined with high accuracy by the position of the arm 17, whereas in contrast a certain play should be possible in the position in height.

As a consequence of the positive guidance of the glass panes by means of the described entraining apparatus, a very accurate positioning of the glass panes in the discharge station 7 can be achieved in a simple manner, which is of considerable importance for the accurate positioning of the glass panes in the adjoining bending or curving station.

We claim:

1. A continuous furnace for heating glass panes to a curving and/or toughening temperature, comprising:
   a horizontal, annular hot gas support bed having a feed station and a discharge station, and further having means for supporting a glass pane for arcuate movement on a layer of hot gas; and
   an entraining apparatus comprising a plurality of entraining elements, each of said entraining elements being driven through said annular support bed from said feed station to said discharge station, each of said entraining elements comprising means for engaging at least two non-parallel sides of a glass sheet and driving the glass sheet from said feed station to said discharge station, the two non-parallel sides each extending substantially parallel to an axis of said arcuate movement.

2. Furnace according to claim 1 wherein the hot gas support bed is subdivided into segments, in each of which segments the gas volumetric flow creating the hot gas cushion and the gas temperature can be separately regulated.

3. Furnace according to claim 1 wherein said supporting means comprise a plate provided with gas outlet openings and gas discharge openings, the gas outlet openings being in communication with a chamber bounded by the plate and a partition parallel thereto, and the gas discharge openings being in communication, via pipes passing through the chamber, with a further chamber bounded at the top by the partition and a blower for driving hot gas through the gas discharge openings.

4. Furnace according to claim 3 including an electrical heater which regulates the temperature of the hot gas, disposed in an intake pipe of the blower.

5. Furnace according to claim 1 wherein the entraining apparatus comprises a star-type turntable rotatably journalled in the central axis of the furnace and having arms extending in a radial direction, at the end of each of which arms one of said entraining devices is mounted.

6. Furnace according to claim 5 wherein the entraining devices for the glass panes each comprises a template of heat-resistant material having an internal shape corresponding to the shape of the glass panes and mounted floating on the hot gas support bed.

7. Furnace according to claim 1 including a radially traversable suction plate disposed in the discharge station above the hot support bed for transferring the heated glass panes into a processing apparatus disposed adjacent to the furnace.

8. Furnace according to claim 7 wherein the processing apparatus disposed adjacent to the furnace is a curving and contact toughening device comprising a lower water-cooled curving mould and an upper water-cooled curving mould.

9. Furnace according to claim 1 wherein said at least two non-parallel sides comprise three non-parallel sides.

* * * * *